United States Patent
Fujishiro

(10) Patent No.: US 9,191,901 B2
(45) Date of Patent: Nov. 17, 2015

(54) RADIO BASE STATION AND POWER CONTROL METHOD

(75) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 352 days.

(21) Appl. No.: 13/805,280

(22) PCT Filed: Jun. 15, 2011

(86) PCT No.: PCT/JP2011/063693
§ 371 (c)(1),
(2), (4) Date: Dec. 18, 2012

(87) PCT Pub. No.: WO2011/158861
PCT Pub. Date: Dec. 22, 2011

(65) Prior Publication Data
US 2013/0102355 A1    Apr. 25, 2013

(30) Foreign Application Priority Data
Jun. 18, 2010 (JP) .................. 2010-140009

(51) Int. Cl.
*H04W 52/02* (2009.01)
*H04W 52/18* (2009.01)
*H04W 72/04* (2009.01)
*H04W 88/08* (2009.01)

(52) U.S. Cl.
CPC .......... *H04W 52/18* (2013.01); *H04W 52/0206* (2013.01); *H04W 72/0486* (2013.01); *H04W 88/08* (2013.01); *Y02B 60/50* (2013.01)

(58) Field of Classification Search
CPC ............ H04W 52/00; H04W 52/0206; H04W 72/0493; H04W 52/18; H04W 72/0486; H04W 88/08; Y02B 60/50
USPC .................................. 455/561, 574
See application file for complete search history.

(56) References Cited

U.S. PATENT DOCUMENTS
2010/0113095 A1*  5/2010  Carmon et al. ............... 455/561

FOREIGN PATENT DOCUMENTS
| JP | 2003-347985 A | 12/2003 |
| JP | 2007-134840 A | 5/2007 |
| JP | 2009-049887 A | 3/2009 |

OTHER PUBLICATIONS

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9); pp. 1-23.

(Continued)

*Primary Examiner* — Raymond Dean
(74) *Attorney, Agent, or Firm* — Studebaker & Brackett PC

(57) ABSTRACT

Disclosed is a wireless base station (eNB10-1) which calculates resource block usage based on the number of resource blocks in the downstream direction (downstream resource block usage) and the number of resource blocks in the upstream direction (upstream resource block usage) allocated to a wireless terminal (UE30-1), and sets the number of DSP for which a power supply should be turned on in a manner such that the number of DSP for which a power supply should be turned on is reduced as resource block usage decreases. In addition, the wireless base station (eNB10-1) turns on the power supply for the set number of DSP and turns off the power supply for the remaining DSP.

5 Claims, 7 Drawing Sheets

(56) References Cited

OTHER PUBLICATIONS

International Search Report; PCT/JP2011/063693; Sep. 6, 2011; with translation.

An Office Action; "Notice of Reasons for Rejection," issued by the Japanese Patent Office on Jan. 7, 2014, which corresponds to Japanese Patent Application No. 2010-140009 and is related to U.S. Appl. No. 13/805,280; with English language statement of relevance.

* cited by examiner

RADIO BASE STATION AND POWER CONTROL METHOD

TECHNICAL FIELD

The present invention relates to a radio communication technology, and more particularly, relates to a radio base station and a power control method, employing SON.

BACKGROUND ART

In an LTE (Long Term Evolution) being standardized in 3GPP (3rd Generation Partnership Project) which is a group aiming to standardize a radio communication system, a technology called SON (Self Organizing Network) is employed. According to the SON, it is expected to automatize the installation or maintenance of a radio base station, which does not require a field measurement or setting by personnel (for example, refer to Non Patent Literature 1).

In the SON, there has been proposed a technique of suppressing power consumption by controlling on/off of power of a radio base station (called "eNB" in the 3GPP). Such a technique is termed "Energy Savings". In the energy savings, when the power of the radio base station eNB is turned on, the radio base station eNB notifies another radio base station eNB that the power of the radio base station eNB is turned on. Furthermore, when turning on the power of another radio base station eNB, the radio base station eNB notifies the other radio base station eNB that the power of the other radio base station eNB is turned on.

However, the aforementioned energy saving technique stipulates only a case where the entire radio base stations eNB, which are considered to be one unit, are turned on or off. Therefore, more efficient power control is demanded where power consumption can be suppressed as much as possible also when a radio base station eNB is operating.

CITATION LIST

Non Patent Literature

[Non Patent Literature 1] 3GPP TR 36.902 V9.1.0 March, 2010

SUMMARY OF INVENTION

A radio base station (radio base station eNB 10-1) according to a first feature is connected with a radio terminal (radio terminal UE 30-1). The radio base station comprises: a plurality of communication processing units (DSP 114-1 to 114-3) that are turned on or off independently; and a control unit (power control unit 122) that controls power of the plurality of communication processing units. The control unit performs a control for turning on the communication processing units of which the number corresponds to a usage amount of a radio resource (resource block) used by the connected radio terminal.

According to the above feature, the radio base station is able to limit the number of communication processing units to be turned on according to the usage amount of radio resources used by the connected radio terminal. Consequently, as compared with the case where the entire radio base station is turned on or off as a unit, more efficient control of power is enabled because it is possible to suppress power consumption also when a radio base station is operating.

In the first feature, the control unit reduces the number of communication processing units to be turned on as the usage amount of the radio resource is smaller.

In the first feature, the usage amount of the radio resource is indicated by a frequency bandwidth.

In the first feature, the usage amount of the radio resource is indicated by a time width.

A power control method according to a second feature is used in a radio base station connected with a radio terminal, which includes a plurality of communication processing units turned on or off independently. The power control method comprises the steps of: controlling power of the plurality of communication processing units. In the step of controlling the power, a control is performed for turning on the communication processing units of which the number corresponds to a usage amount of a radio resource used by the connected radio terminal.

DESCRIPTION OF EMBODIMENTS

Figure 1:
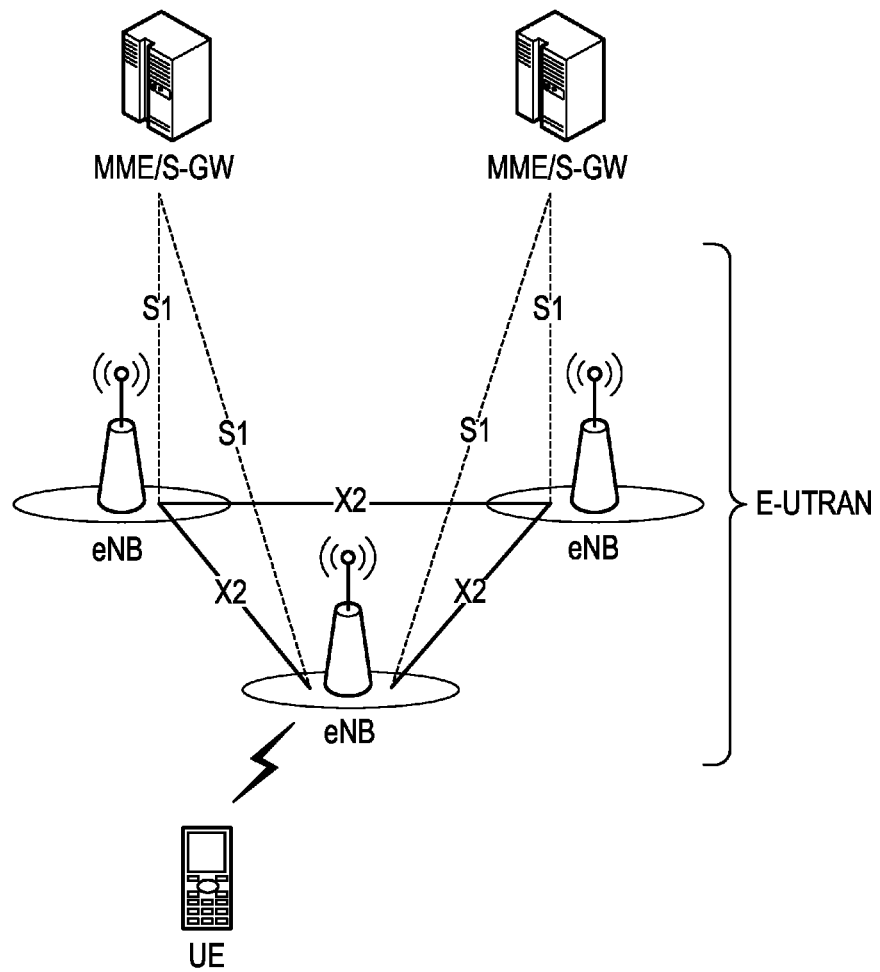
FIG. 1 is a diagram for explaining the overview of an LTE system.

Next, an embodiment of the present invention will be described with reference to the drawings. Specifically, (1) Overview of LTE system, (2) Configuration of radio communication system, (3) Configuration of radio base station, (4) Operation of radio base station, (5) Operation and effect, and (6) Other embodiments will be described. It is to be noted that the same or similar reference numerals are applied to the same or similar parts through the drawings in the following embodiments.

(1) Overview of LTE System

FIG. 1 is a diagram for explaining the overview of an LTE system. As illustrated in FIG. 1, a plurality of radio base stations eNB constitute E-UTRAN (Evolved-UMTS Terrestrial Radio Access Network). Each of the plurality of radio base stations eNB forms a cell that is a communication area where a service should be provided to the radio terminal UE.

A radio terminal UE is a radio communication device owned by a user, and is also called as "User Equipment". The radio terminal UE measures quality (that is, radio quality) of a radio signal received from a radio base station eNB, and transmits a report (hereinafter, a measurement result report)

of a measurement result of the radio quality to a radio base station eNB to which the radio terminal UE is connected.

Such radio quality includes reference signal received power (RSRP), signal-to-interference noise ratio (SINR) and the like. The measurement result report related to the RSRP is called a measurement report, and the measurement result report related to an index of the SINR is called CQI (Channel Quality Indicator).

Furthermore, the radio base station eNB, to which the radio terminal UE is connected, assigns a resource block, which is an assignment unit of a radio resource, to the radio terminal UE on the basis of the CQI received from the radio terminal UE.

The radio base stations eNB are capable of communicating with one another through an X2 interface which is a logical communication path through which it is possible to communicate among base stations. Each of the plurality of radio base stations eNB can communicate with EPC (Evolved Packet Core), more specifically, with MME (Mobility Management Entity)/S-GW (Serving Gateway) via an S1 interface.

(2) Configuration of Radio Communication System

Figure 2:
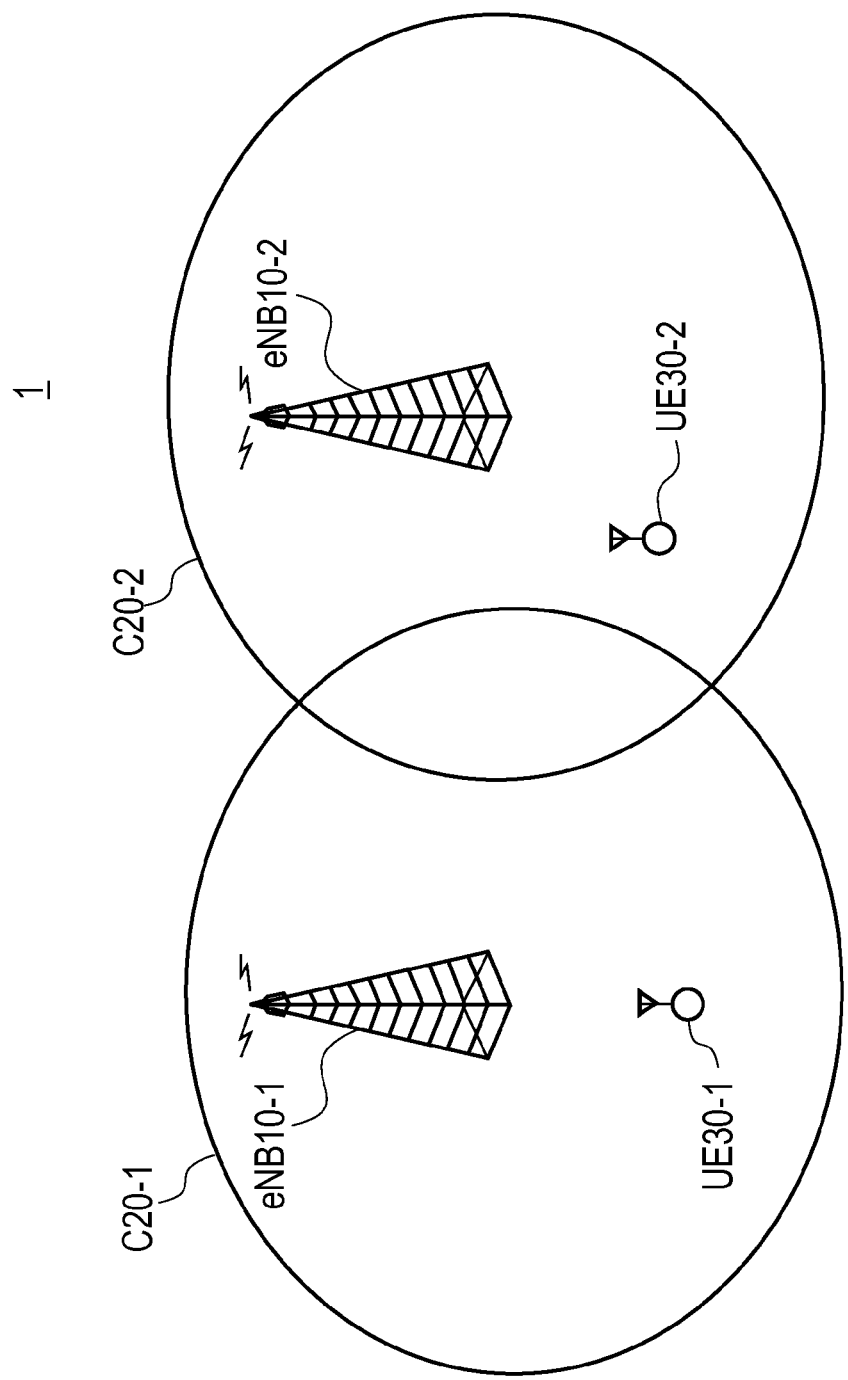
FIG. 2 is a schematic configuration diagram of a radio communication system according to an embodiment of the present invention.

FIG. 2 is a schematic configuration diagram of a radio communication system 1 according to the present embodiment.

As illustrated in FIG. 2, the radio communication system 1 includes a radio base station eNB10-1 forming a cell C20-1, a radio base station eNB10-2 forming a cell C20-2, a radio terminal UE30-1 in the cell C20-1, and a radio terminal UE30-2 in the cell C20-2. The radio base station eNB10-1 and the radio base station eNB10-2 are able to communicate between the base stations using the aforementioned X2 interface. Furthermore, the radio base station eNB10-1 performs radio communication with the radio terminal UE30-1 in the cell C20-1, and the radio base station eNB10-2 performs radio communication with the radio terminal UE30-2 in the cell C20-2.

(3) Configuration of Radio Base Station

Figure 3:
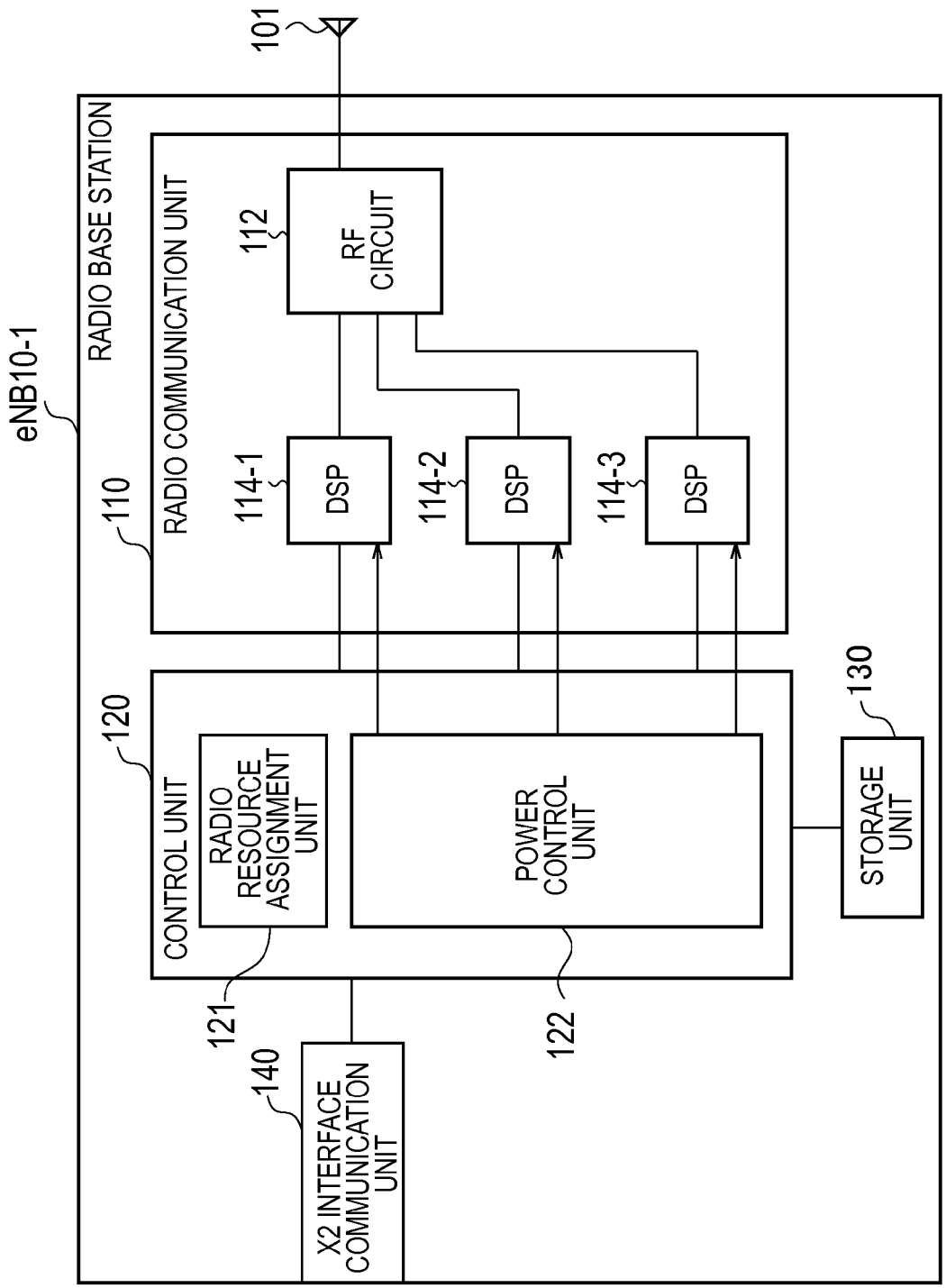
FIG. 3 is a block diagram illustrating a configuration of a radio base station according to the embodiment of the present invention.

Next, the configuration of the radio base station eNB10-1 will be described. FIG. 3 is a block diagram illustrating the configuration of the radio base station eNB10-1 according to the present embodiment. In addition, the radio base station eNB10-2 also has the same configuration as that of the radio base station eNB10-1.

As illustrated in FIG. 3, the radio base station eNB10-1 includes an antenna 101, a radio communication unit 110, a control unit 120, a storage unit 130, and an X2 interface communication unit 140.

The antenna 101 is used for transmitting and receiving a radio signal to and from the radio terminal UE30-1.

The radio communication unit 110 includes a radio frequency (RF) circuit 112, a DSP (Digital Signal Processor) 114-1, a DSP 114-2, and a DSP 114-3. The DSP 114-1, the DSP 114-2, and the DSP 114-3 are turned on or off independently. In the present embodiment, the DSP 114-1, the DSP 114-2, and the DSP 114-3 correspond to a communication processing unit.

At the time of reception, the RF circuit 112 performs down-conversion from a radio frequency band to a baseband and analog-to-digital (A/D) conversion for a signal received by the antenna 101. Moreover, the RF circuit 112 outputs a digital signal to DSP, which is to be turned on by power control which will be described later, among the DSP 114-1, the DSP 114-2, and the DSP 114-3.

Furthermore, at the time of transmission, the RF circuit 112 performs digital-to-analog (D/A) conversion and up-conversion from a baseband to a radio frequency band for a digital signal from the DSP, which is to be turned on by power control which will be described later, among the DSP 114-1, the DSP 114-2, and the DSP 114-3. Moreover, the RF circuit 112 transmits a signal of the radio frequency band through the antenna 101.

At the time of reception, when the DSP 114-1, the DSP 114-2, and the DSP 114-3 are turned on, they perform predetermined signal processing for the digital signal from the RF circuit 112 and output a processed digital signal to the control unit 120. Furthermore, at the time of transmission, when the DSP 114-1, the DSP 114-2, and the DSP 114-3 are turned on, they perform predetermined signal processing for a digital signal from the control unit 120 and output a processed digital signal to the RF circuit 112.

The control unit 120 is configured by using a CPU, for example, and controls various functions provided in the radio base station eNB10-1. The storage unit 130 is configured by using a memory, for example, and stores various types of information used for the control and the like of the radio base station eNB10-1. The X2 interface communication unit 140 communicates with the radio base station eNB10-2, that is, communicates between the radio base stations, by using the X2 interface.

The control unit 120 includes a radio resource assignment unit 121 and a power control unit 122.

Based on the CQI received from the radio terminal UE30-1 in the cell C20-1, the radio resource assignment unit 121 assigns a resource block to the radio terminal UE30-1 as a radio resource.

Figure 4:
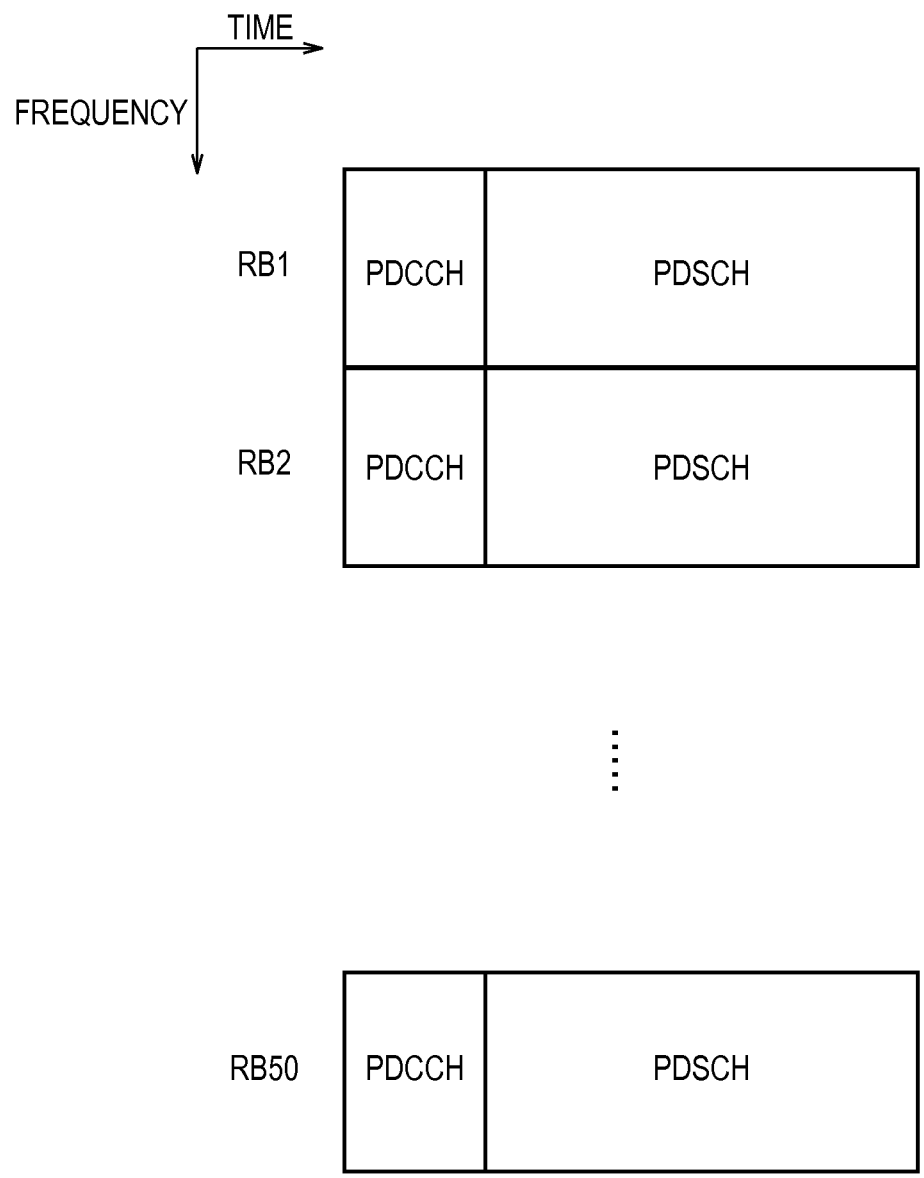
FIG. 4 is a diagram illustrating an example of a downlink radio resource according to the embodiment of the present invention.

FIG. 4 is a diagram illustrating an example of a downlink radio resource that can be assigned by the radio resource assignment unit 121 to the radio terminal UE30-1. For example, when an assignable downlink frequency bandwidth is 10 [MHz], a downlink frequency band is divided into 50 resource blocks (RBs) 1 to 50. Each resource block is configured by a control information channel (PDCCH: Physical Downlink Control CHannel) for downlink control information transmission and a shared data channel (PDSCH: Physical Downlink Shared CHannel) for downlink user data transmission.

Figure 5:
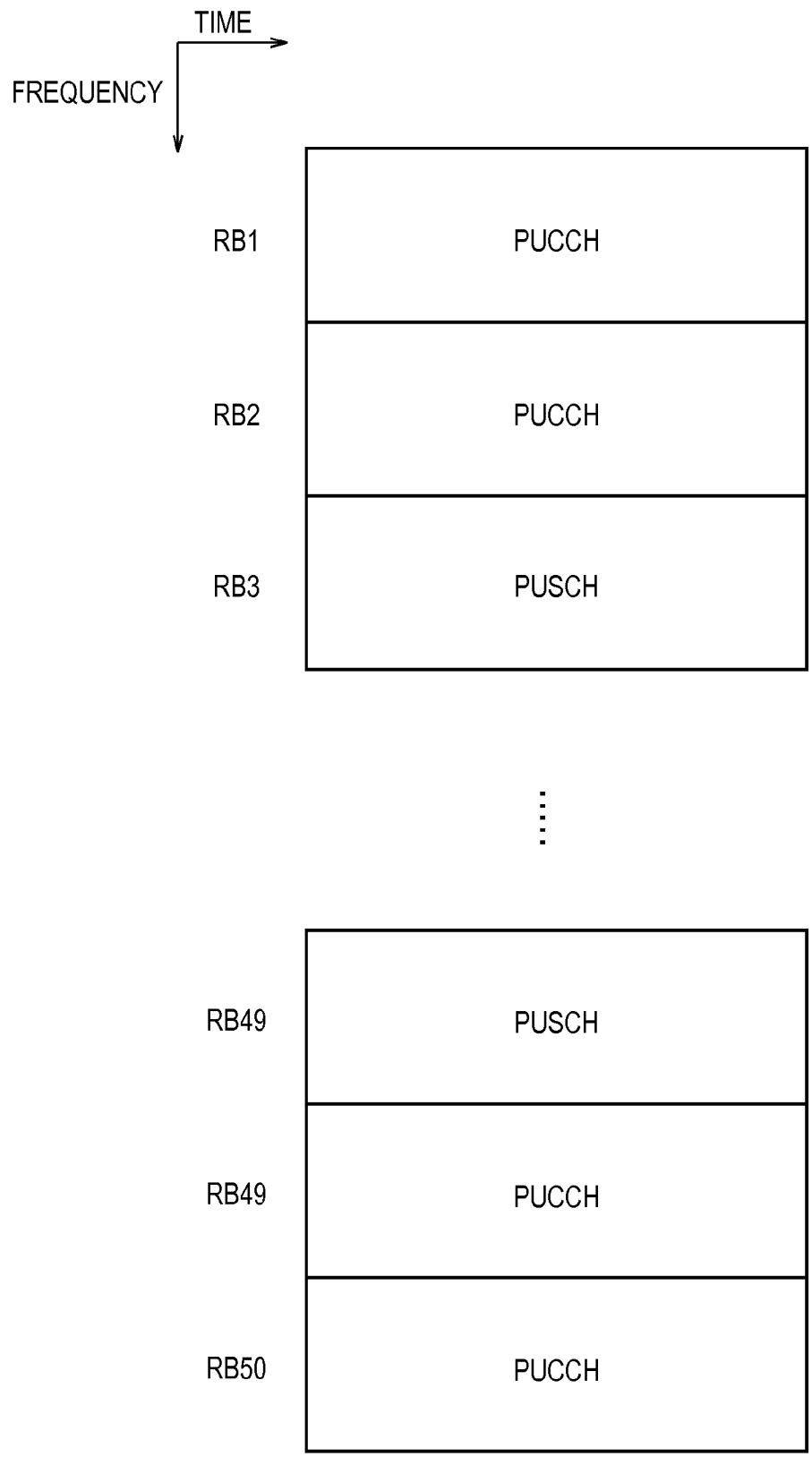
FIG. 5 is a diagram illustrating an example of an uplink radio resource according to the embodiment of the present invention.
Figure 6:
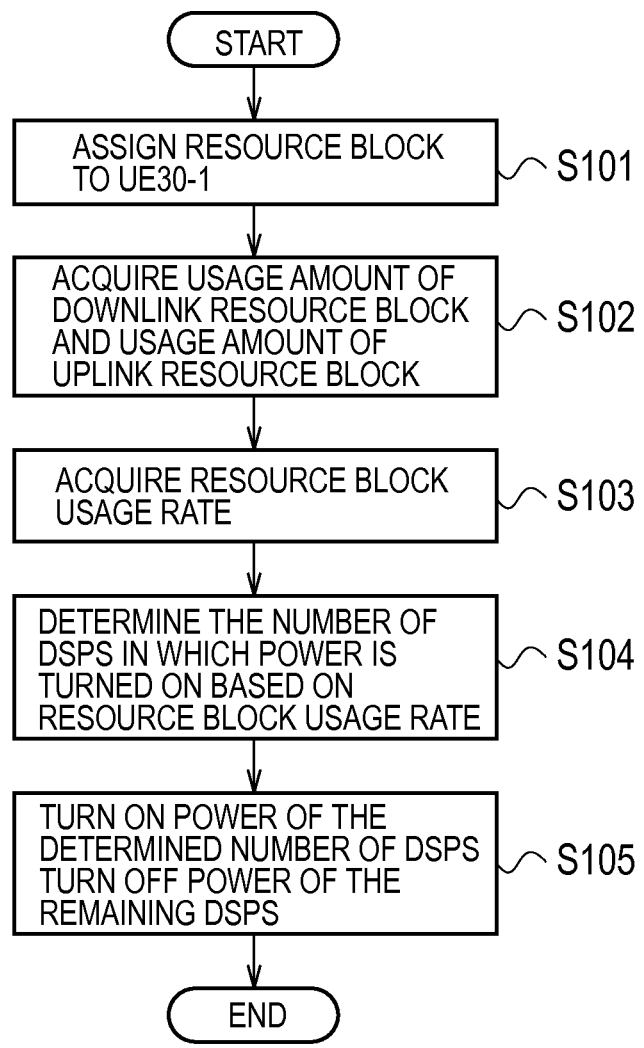
FIG. 6 is a flowchart illustrating an operation of the radio base station according to the embodiment of the present invention.

FIG. 5 is a diagram illustrating an example of an uplink radio resource that can be assigned by the radio resource assignment unit 121 to the radio terminal UE30-1. When an assignable downlink frequency bandwidth is 10 [MHz], a downlink frequency band is divided into 50 resource blocks (RBs) 1 to 50. The resource blocks is configured by control information channel (PUCCH: Physical Uplink Control CHannel) resource blocks for uplink control information transmission, and shared data channel (PUSCH: Physical Uplink Shared CHannel) resource blocks for uplink user data transmission.

The power control unit 122 controls the power of the DSP 114-1, the DSP 114-2, and the DSP 114-3.

Specifically, the power control unit 122 acquires the amount of downlink resource blocks (the usage amount of the downlink resource blocks), which indicates the usage amount of radio resources assigned to the radio terminal UE30-1 by the radio resource assignment unit 121, and acquires the amount of uplink resource blocks (the usage amount of the uplink resource blocks), which indicates the usage amount of radio resources.

The power control unit 122 divides the usage amount of the downlink resource blocks by the total number of assignable downlink resource blocks, thereby calculating a usage rate of the downlink resource blocks. Similarly, the power control unit 122 divides the usage amount of the uplink resource blocks by the total number of assignable uplink resource blocks, thereby calculating a usage rate of the uplink resource blocks.

The power control unit 122 selects a usage rate with a larger value between the usage rate of the downlink resource blocks and the usage rate of the uplink resource blocks as a usage rate of resource blocks. The power control unit 122 determines the number of DSPs to be turned on based on the usage rate of the resource blocks. Furthermore, the power control unit 122 determines the number of the DSPs to be turned on such that the number of the DSPs to be turned on is smaller as the usage rate of the resource blocks is smaller. In other words, the power control unit 122 determines the number of the DSPs to be turned on such that the usage rate of the resource blocks is proportional to the number of the DSPs to be turned on.

In the present embodiment, the three DSPs, that is, the DSP 114-1, the DSP 114-2, and the DSP 114-3 are provided in the radio communication unit 110. When the usage rate of the resource blocks is smaller than 33%, the power control unit 122 determines one DSP to be turned on. When the usage rate of the resource blocks is equal to or more than 33% and is smaller than 66%, the power control unit 122 determines two DSPs to be turned on. When the usage rate of the resource blocks is equal to or more than 66%, the power control unit 122 determines three DSPs to be turned on.

The power control unit 122 performs control for turning on the power of the DSPs of which the number is determined by the aforementioned procedure among the DSP 114-1, the DSP 114-2, and the DSP 114-3, and turning off the power of remaining DSPs.

(4) Operation of Radio Base Station

FIG. 4 is a flowchart illustrating an operation of the radio base station eNB10-1 according to the present embodiment.

In step S101, the radio resource assignment unit 121 of the control unit 120 assigns a resource block to the radio terminal UE30-1 in the cell C20-1 as a radio resource.

In step S102, the power control unit 122 of the control unit 120 acquires the amount of downlink resource blocks (the usage amount of the downlink resource blocks) and the amount of uplink resource blocks (the usage amount of the uplink resource blocks), which were assigned to the radio terminal UE30-1 by the radio resource assignment unit 121.

In step S103, the power control unit 122 of the control unit 120 calculates the usage rate of the downlink resource blocks from the usage amount of the downlink resource blocks, and calculates the usage rate of the uplink resource blocks from the usage amount of the uplink resource blocks. Moreover, the power control unit 122 of the control unit 120 acquires a usage rate with a larger value between the usage rate of the downlink resource blocks and the usage rate of the uplink resource blocks as a usage rate of resource blocks.

In step S104, the power control unit 122 of the control unit 120 determines the number of DSPs to be turned on based on the usage rate of the resource blocks.

In step S105, the power control unit 122 of the control unit 120 performs control for turning on the power of the DSPs of which the number is determined in step S104 among the DSP 114-1, the DSP 114-2, and the DSP 114-3, and turning off the power of remaining DSPs.

(5) Operation and Effect

As described above, according to the present embodiment, the radio base station eNB10-1 calculates the usage rate of the resource blocks on the basis of the amount of the downlink resource blocks (the usage amount of the downlink resource blocks) and the amount of the uplink resource blocks (the usage amount of the uplink resource blocks), which were assigned to the radio terminal UE30-1, and determines the number of DSPs to be turned on such that the number of DSPs to be turned on is smaller as the usage rate of the resource blocks is lower. Moreover, the radio base station eNB10-1 performs control for turning on the power of the determined number of DSPs and turning off the power of remaining DSPs. Consequently, as compared with the conventional art where the entire radio base station is turned on or off as a unit, it is possible to more efficiently control the power of the radio base station eNB10-1 in which power consumption is suppressed as much as possible also when the radio base station eNB10-1 is operating.

(6) Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiment, the usage amount of the radio resources indicates the usage amount of resource blocks in the frequency direction. That is, the usage amount of the radio resources is indicated by a frequency bandwidth. However, the usage amount of the radio resources may be indicated by a time width.

In this case, the power control unit 122 acquires the amount (the usage amount of downlink subframes) of subframes (which are downlink time slots), which indicates the usage amount of the radio resources assigned to the radio terminal UE30-1 by the radio resource assignment unit 121, and acquires the amount of uplink subframes (the usage amount of the uplink subframes), which indicates the usage amount of radio resources.

The power control unit 122 divides the usage amount of the downlink subframes by the total number of assignable downlink subframes, thereby calculating a usage rate of the downlink subframes. Similarly, the power control unit 122 divides the usage amount of the uplink subframes by the total number of assignable uplink subframes, thereby calculating a usage rate of the uplink subframes.

The power control unit 122 selects a usage rate with a larger value between the usage rate of the downlink subframes and the usage rate of the uplink subframes as a usage rate of subframes. The power control unit 122 determines the number of DSPs to be turned on based on the usage rate of the subframes. Furthermore, the power control unit 122 determines the number of the DSPs to be turned on such that the number of the DSPs to be turned on is smaller as the usage rate of the subframes is lower.

Furthermore, in the aforementioned embodiment, the power control unit 122 selects the usage rate with a larger value between the usage rate of the downlink resource blocks and the usage rate of the uplink resource blocks as the usage rate of the resource blocks. However, an average value of the usage rate of the downlink resource blocks and the usage rate of the uplink resource blocks may be used as the usage rate of the resource blocks. Furthermore, the power control unit 122 may acquire only one of the usage amount of the downlink resource blocks and the usage amount of the uplink resource blocks, thereby calculating the usage rate of the resource blocks on the basis of only the acquired usage amount of the resource blocks.

The same procedure is applied to the case in which the radio resource is the subframe. That is, the power control unit 122 may use an average value of the usage rate of the downlink subframes and the usage rate of the uplink subframes as the usage rate of the subframes. Furthermore, the power control unit 122 may acquire only one of the usage amount of the downlink subframes and the usage amount of the uplink subframes, thereby calculating the usage rate of the subframes on the basis of only the acquired usage amount of subframes.

Furthermore, in the aforementioned embodiment, the power control unit 122 turns on the power of DSPs of which the number is in accordance with the usage rate of the resource blocks. However, a traffic amount between the radio terminal UE30-1 and the radio base station eNB10-1 may be used as the usage amount of the radio resources, and the power of DSPs of which the number is in accordance with the traffic amount may be turned on. In this case, as the traffic amount between the radio terminal UE30-1 and the radio base station eNB10-1 is smaller, the power control unit 122 reduces more the number of DSPs to be turned on.

Furthermore, in the LTE-Advanced, there is a case in which MIMO (Multi Input Multi Output) is employed in order to improve a data rate. The present invention can also be applied to a radio base station eNB employing the MIMO in the same manner.

Figure 7:
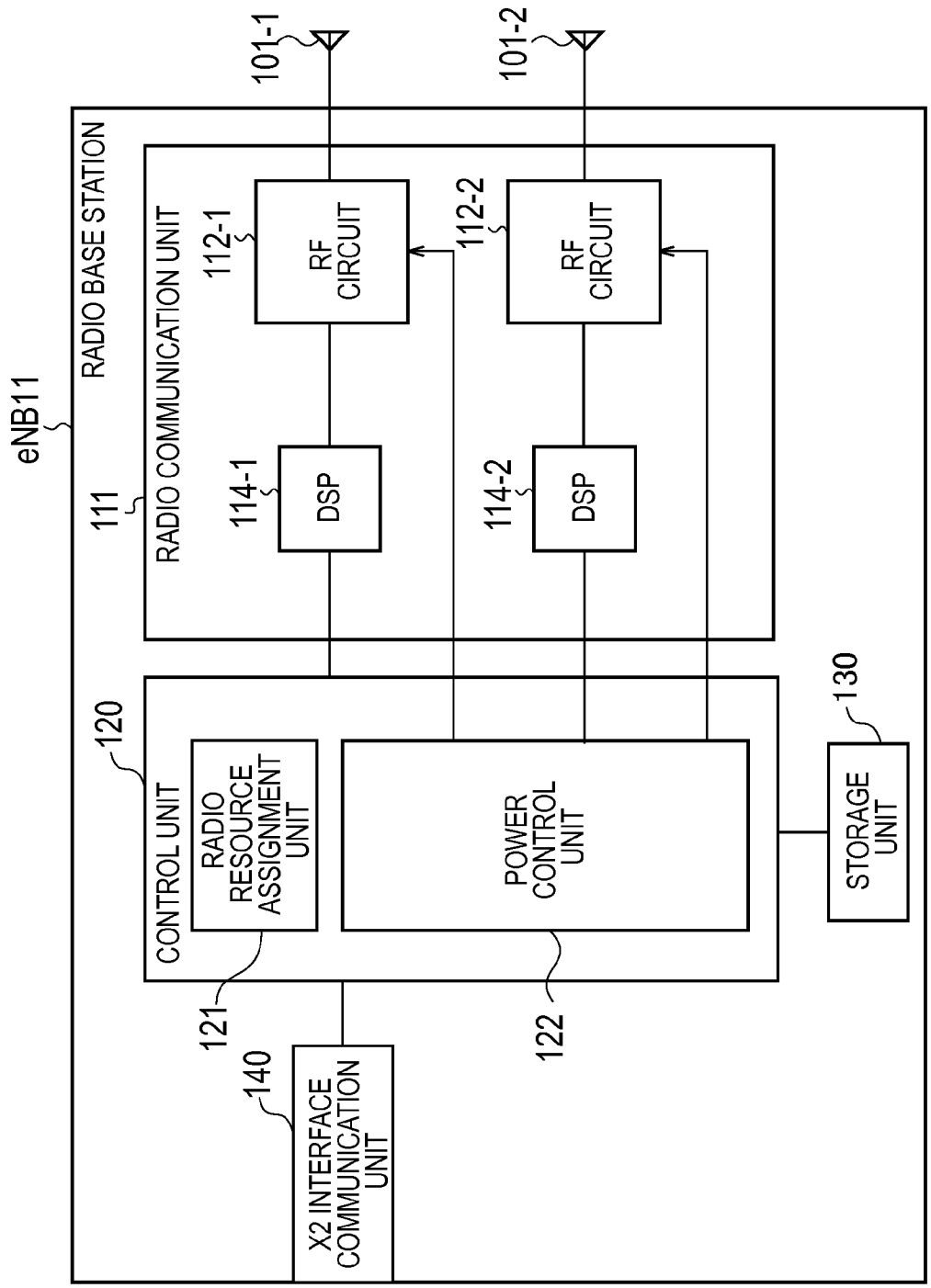
FIG. 7 is a block diagram illustrating a configuration of a radio base station according to another embodiment of the present invention.

FIG. 7 is a block diagram illustrating a configuration of a radio base station eNB11 employing the MIMO.

As illustrated in FIG. 7, the radio base station eNB11 includes an antenna 101-1, an antenna 101-2, a radio communication unit 111, the control unit 120, the storage unit 130, and the X2 interface communication unit 140. The radio base station eNB11 is able to realize two streams (2×2 MIMO).

The antenna 101-1 and the antenna 101-2 are used for transmitting and receiving a radio signal to and from the radio terminal UE30-1. Furthermore, in single user MIMO (S-MIMO), the antenna 101-1 and the antenna 101-2 are used for transmitting and receiving a radio signal to and from one radio terminal UE30-1. Meanwhile, in multi-user MIMO (MS-MIMO), the antenna 101-1 and the antenna 101-2 are used for transmitting and receiving a radio signal to and from different radio terminals UE30-1, respectively.

The radio communication unit 111 includes a radio frequency (RF) circuit 112-1 to which the antenna 101-1 is connected and an RF circuit 112-2 to which the antenna 101-2 is connected. The RF circuit 112-1, the RF circuit 112-2, and the RF circuit 112-3 are turned on or off independently. In the present embodiment, the RF circuit 112-1 and the RF circuit 112-2 correspond to a communication processing unit.

Furthermore, the radio communication unit 111 includes the DSP 114-1 to which the RF circuit 112-1 is connected and the DSP 114-2 to which the RF circuit 112-2 is connected.

In the case in which the RF circuit 112-1 is turned on, at the time of reception, the RF circuit 112-1 performs down-conversion from a radio frequency band to a baseband and analog-to-digital (A/D) conversion for a signal received by the antenna 101-1. Moreover, the RF circuit 112-1 outputs a digital signal to the DSP 114-1. The RF circuit 112-2 also performs the same processes.

Furthermore, in the case where the RF circuit 112-1 is turned on, at the time of transmission, the RF circuit 112-1 performs digital-to-analog (D/A) conversion and up-conversion from a baseband to a radio frequency band for a digital signal from the DSP 114-1. Moreover, the RF circuit 112-1 transmits a signal of the radio frequency band through the antenna 101-1. The RF circuit 112-2 also performs the same processes.

Since the DSP 114-1 and the DSP 114-2 perform the same processes as those of the aforementioned embodiment, a description thereof will be omitted.

The control unit 120, for example, is configured by using a CPU, and controls various functions of the radio base station eNB11. The storage unit 130 stores various types of information used for the control and the like of the radio base station eNB10-1. The X2 interface communication unit 140 communicates with the radio base station eNB10-2, that is, communicates between the radio base stations, by using the X2 interface.

The control unit 120 includes a radio resource assignment unit 121 and a power control unit 122.

Based on the CQI received from the radio terminal UE30-1 in the cell C20-1, the radio resource assignment unit 121 assigns a resource block to the radio terminal UE30-1 as a radio resource.

The power control unit 122 controls the power of the RF circuit 112-1 and the power of the RF circuit 112-2.

Specifically, the power control unit 122 performs the same processes as those of the aforementioned embodiment. That is, the power control unit 122 acquires the usage amount of downlink resource blocks and the usage amount of uplink resource blocks.

The power control unit 122 divides the usage amount of the downlink resource blocks by the total number of assignable downlink resource blocks, thereby calculating a usage rate of the downlink resource blocks. Similarly, the power control unit 122 divides the usage amount of the uplink resource blocks by the total number of assignable uplink resource blocks, thereby calculating a usage rate of the uplink resource blocks.

The power control unit 122 selects a usage rate with a larger value between the usage rate of the downlink resource blocks and the usage rate of the uplink resource blocks as a usage rate of resource blocks. The power control unit 122 determines the number of RF circuits to be turned on based on the usage rate of the resource blocks. Furthermore, the power control unit 122 determines the number of the DSPs to be turned on such that the number of the RF circuits to be turned on is smaller as the usage rate of the resource blocks is lower. The power control unit 122 controls so that the power of RF circuits of which the number has been determined is turned on and the power of the remaining RF circuits is turned off, out of the RF circuit 112-1 and the RF circuit 112-2.

Furthermore, the case of turning on the power of one of the RF circuit 112-1 and the RF circuit 112-2 and turning off the power of the other one corresponds to SISO (Single Input Single Output) transmission. In addition, the power control unit 122 may perform control for turning on the power of DSP connected to an RF circuit to be turned on and turning off the power of DSP connected to an RF circuit to be turned off. Furthermore, the power control unit 122 may determine the number of RF circuits to be turned on based on a traffic amount between the radio terminal UE30-1 and the radio base station eNB11.

Furthermore, in the aforementioned embodiment, the LTE system was described. However, the present invention may also be applied to other radio communication systems such as a radio communication system based on WiMAX (IEEE 802.16).

Thus, it must be understood that the present invention includes various embodiments that are not described herein.

Therefore, the present invention is limited only by the specific features of the invention in the scope of the claims reasonably evident from the disclosure above.

In addition, the entire content of Japanese Patent Application No. 2010-140009 (filed on Jun. 18, 2010) is incorporated in the present specification by reference.

INDUSTRIAL APPLICABILITY

According to the present invention, it is possible to provide a radio base station and a power control method, with which it is possible to perform efficient power control.

The invention claimed is:

1. A radio base station connected with a radio terminal, comprising:
   a plurality of communication processing units that are turned on or off independently; and
   a control unit that controls power of the plurality of communication processing units, wherein
   the control unit performs a control for turning on the communication processing units of which the number of communication processing units corresponds to a usage amount with a larger value between a usage amount of an uplink radio resource and a usage amount of a downlink radio resource used by the connected radio terminal.

2. The radio base station according to claim 1, wherein
   the control unit reduces the number of communication processing units to be turned on as the usage amount with a larger value is smaller.

3. The radio base station according to claim 1, wherein
   the usage amount of the uplink and downlink radio resources is indicated by a frequency bandwidth.

4. The radio base station according to claim 1, wherein
   the usage amount of the uplink and downlink radio resources is indicated by a time width.

5. A power control method in a radio base station connected with a radio terminal, which includes a plurality of communication processing units turned on or off independently, comprising the steps of:
   controlling power of the plurality of communication processing units, wherein
   in the step of controlling the power, a control is performed for turning on the communication processing units of which the number of communication processing units corresponds to a usage amount with a larger value between a usage amount of an uplink radio resource and a usage amount of a downlink radio resource used by the connected radio terminal.

* * * * *